Aug. 25, 1931.  J. A. TESTA  1,820,584
BATTERY CABLE TERMINAL
Filed Jan. 13, 1930
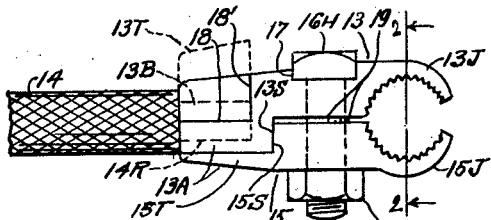
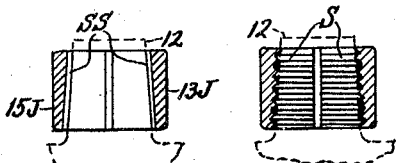
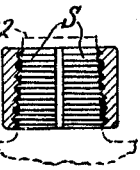
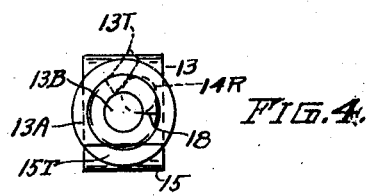
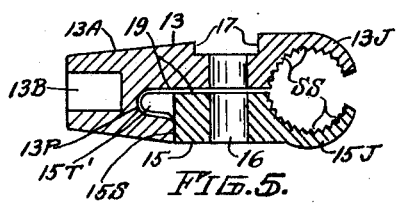
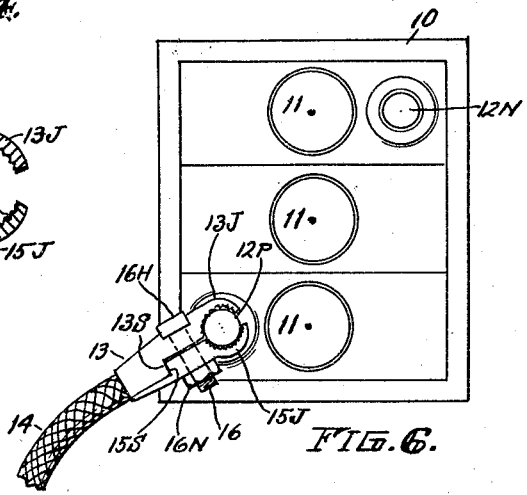
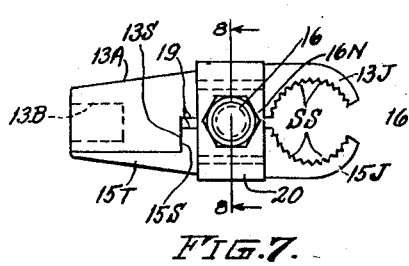
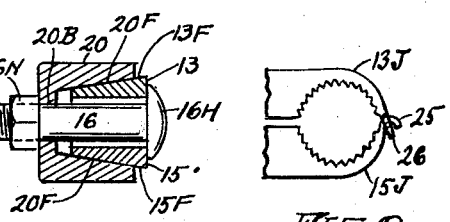
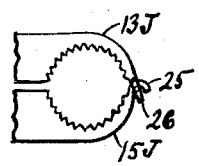
INVENTOR:
Joseph A. Testa
BY David E. Carlsen
ATTORNEY.

Patented Aug. 25, 1931

1,820,584

UNITED STATES PATENT OFFICE

JOSEPH A. TESTA, OF ST. PAUL, MINNESOTA, ASSIGNOR TO FREDERICK P. SCHNEIDER, GONERD W. PETERSON, AND HENRY G. PETERSON, ALL OF ST. PAUL, MINNESOTA

BATTERY CABLE TERMINAL

Application filed January 13, 1930. Serial No. 420,555.

My invention relates to storage battery cable terminals and particularly to a type of cable terminal adaptable for use on automobile batteries or like batteries having the usual fixed terminals located diagonally opposite and projecting vertically from the end cells of such batteries.

The main object of the invention is to provide a simple, inexpensive and easily connected cable terminal, the use of which enables an operator to quickly attach or detach the device from a battery terminal regardless of accumulated corrosion usually forming in such places, a further feature being that the clamping means involves the use of a bolt remote from other parts of a battery apt to be injured by wrenches, pliers or other tools used, all as hereinafter fully set forth, reference being had to the accompanying drawings, in which,—

Fig. 1 is a top view of my improved cable terminal in a preferred form and a portion of a cable connected with it.

Fig. 2 is a cross sectional detail of the jaw members as on line 2—2 in Fig. 1 and Fig. 3 is a modification of Fig. 2.

Fig. 4 is a left hand end view of Fig. 1 omitting the cable.

Fig. 5 is a longitudinal central section of the cable terminal with a modification.

Fig. 6 is a top view of a storage battery of common type and cable connected thereto with my improved terminal.

Fig. 7 is a modification of Fig. 1 omitting the cable and Fig. 8 is a cross section of a modified form of clamp closing means as on line 8—8 in Fig. 7.

Fig. 9 is a side elevation of the jaw members of my device only, modified to interlock each other.

Referring to the drawings by reference numerals, 10 designates a 3-cell type of storage battery, the top central part of each cell having a filler cap 11 and 12N and 12P are respectively the negative and positive terminal posts, said posts being designated 12 only in Figs. 2 and 3.

The cable terminal comprises a main metal cable retaining member 13, the rear part of which is a tapered shank 13A and bored centrally as 13B to retain the exposed metal core or wire rope 14R of a cable 14 suitably insulated. The other end of this shank member comprises a semi-circular jaw 13J suitably serrated interiorly either as 13J' (Figs. 1, 2, 5, 6 and 7) or as 13J' in Fig. 3.

15 is a secondary jaw and shank member normally in parallel relation to and drawn toward the main shank member 13 by an adjustment bolt 16, said secondary member having also a semi-circular jaw 15J corresponding to jaw 13J and similarly serrated interiorly. The two jaw members 13J and 15J are drawn toward each other to clamp around a battery terminal 12, the serrations whether horizontal or vertical serving to frictionally engage the post. The clamping means involve the bolt 16, its nut 16N, the main and secondary members of the terminal having alined transverse bores for the bolt intermediate the ends of the terminal and the main member preferably being countersunk or grooved as at 17 to retain the head of the bolt therein and prevent rotation of the bolt. Rearwardly of the bolt member 13 is formed with a transverse shoulder 13S and member 15 has a corresponding shoulder 15S rearward of which the latter comprises a rearwardly tapering tongue 15T rounded exteriorly to conform to the taper rear end of member 13.

The rear, tapered and bored shank part of member 13 is preferably slitted in L-shape, longitudinally and inwardly as 18 and thence circumferentially as 18' about 90 degrees so that the metal therebetween forms a tab or tongue which may be bent outwardly as to dotted positions 13T in Figs. 1 and 4, providing a lateral opening from bore 13B through which the metal strand part of a cable may be slipped into the bore 13B as indicated by circle 14R in Fig. 4, and after the cable end has thus been put in place it may be retained rigidly by bending the tab 13T back again and hammering or pinching it inwardly and around the cable.

The clamp members have adjacent parallel faces 19 forward of their shoulder parts to the jaw members. In removing a clamp from a battery terminal the nut 16N is of course first loosened and the jaws should readily be removed from the post, but in case corrosion, frost or any other condition causes the clamps to stick to the terminal they are easily separated by inserting a screw driver or other flat or tapered element between the faces 19 and twisting same or wedging the jaw members apart. The jaw faces 19 are of course so positioned that they will never contact when the jaws clamp about a terminal post as the bolt is drawn tight.

In the modification Figs. 7 and 8, the respective jaw members are in general appearance the same as in Fig. 1 but the adjustment bolt passes through the device in a transverse position at right angles to the position in Fig. 1, that is the bolt passes through between the jaw faces 19, intermediate the jaws and the rear shank, said faced parts being drilled or bored, as 19, for the bolt to pass through loosely, the head 16H of the bolt bearing against the outer faces of the respective jaw members (Fig. 8).

20 is a U-shaped yoke, the base of which is bored at 20B for the bolt 16 and the legs of said yoke having angular faces 20F flared outwardly. Intermediate the jaws and shank parts of the clamp the respective jaw members have corresponding angular faces 13F engaged frictionally and slidably by the inner faces 20F of the yoke. Thus when nut 16N is drawn up it is obvious that the yoke 20 forces the members 13—15 toward each other and the jaws 13J—15J are clamped on a battery terminal post.

I have stated that the interior parts of the jaws 13J and 15J are preferably serrated. Said serrated parts are of course counterparts, each arcuate and being nearly semicircular, the front ends being preferably spaced apart even when the members are clamped on a post. The said serrated parts may be formed for tapered or straight battery posts, such posts usually being tapered. The serrations are straight longitudinally of the post to which they are clamped and designated SS in Fig. 2, whereas in Fig. 3 the serrations are circumferential and designated simply S.

In Fig. 5 the tapered shank end of member 13 is whole and the member 15 terminates at shoulder 15S except that adjacent to face 19 the latter member 15 is provided with an integral, rearward tongue extension 15T' adapted to be fitted into a corresponding pocket 13P to interlock the two members in addition to the bolt connection between them and to hold the two parts in correct parallel relation to each other.

I have shown and described my cable terminal device in preferred construction, it being obvious that further modifications may be embodied without departing from the scope and spirit of the invention.

In Fig. 9 the jaws 13J—15J are interlocked outwardly of the battery terminal engaging means by simply providing said jaws one with a hook extension 25 removably insertible in a slit provided in the extension 26 of the other jaw.

I claim:

1. A cable terminal of the class described comprising a pair of elongated metal members each with an arcuate jaw member at one end, said jaws being counterparts, means intermediate the ends for adjusting said members and their jaws toward each other, one member formed with a cable receiving shank, transverse shoulder means on both members normally in slidable contact and rearward of the clamping means, said members provided forward of said shoulder means with spaced parallel faces, and means in said cable shank to facilitate the insertion of a battery cable to be held therein.

2. A cable terminal of the class described comprising a pair of elongated metal members each with an arcuate jaw member at one end, said jaws being counterparts, means intermediate the ends for adjusting said members and their jaws toward each other, one member formed with a cable receiving shank, transverse shoulder means on both members normally in slidable contact and rearward of the clamping means, said members provided forward of said shoulder means with spaced parallel faces, and means in said cable shank to facilitate the insertion of a battery cable to be held therein, consisting in the provision of a central bore in the said shank, slitting the wall of said shank part longitudinally of said bore, thence transversely part way around the shank to provide a portion of said shank adapted to be bent outwardly or closed inwardly as shown and described.

3. The structure specified in claim 1 and interlocking means for said members at their shoulder parts comprising a tongue extension on one member and a receiving socket therefor in the other member.

4. A battery cable terminal comprising an elongated two-part metal member formed with counterpart jaws at one end, one jaw on each part, a tapered cable receiving shank formed at the opposite end from said jaws, means intermediate said ends on both parts of the terminal comprising angularly directed external faces tapered toward one side of the device, a U-shaped metal clip with corresponding inner angular faces adapted to frictionally engage said first described tapered faces, a bolt passed through all three said parts and a takeup nut thereon to draw the clip forcibly upon the said tapered parts and force the jaw members toward each other.

5. The structure specified in claim 1 in which said jaw parts are formed at their free ends, one with a hook terminal and the other with an extended part with a groove in which said hook is freely insertible.

In testimony whereof I affix my signature.

JOSEPH A. TESTA.